Patented Feb. 13, 1951

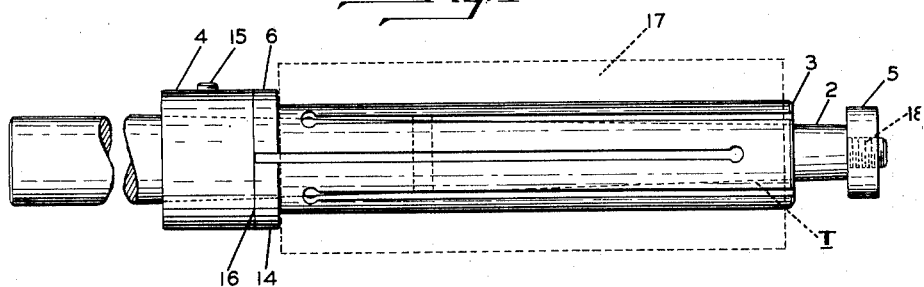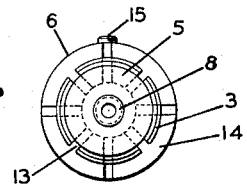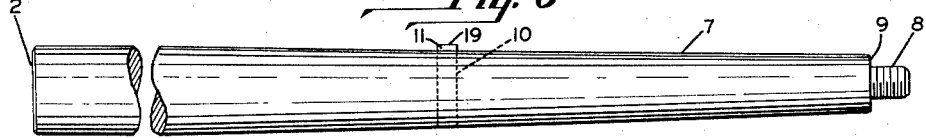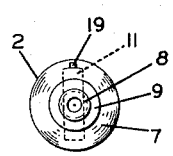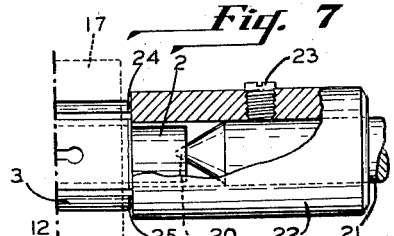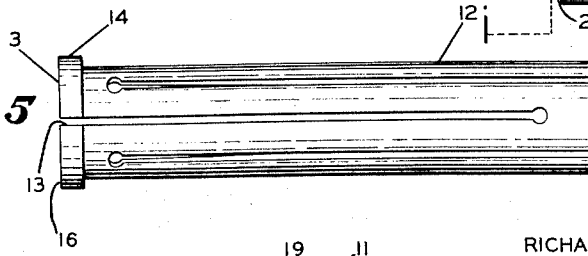

2,541,078

UNITED STATES PATENT OFFICE 2,541,078

WORK HOLDER FOR HOLLOW RADIALLY EXPANSIBLE MATERIALS

Richard F. Lescallette, Sewickley, Pa., assignor to Armstrong Cork Company, Lancaster, Pa., a corporation of Pennsylvania Application September 14, 1948, Serial No. 49,195

7 Claims. (Cl. 51—227)

This invention relates to a work holder for hollow radially expansible materials and is directed more particularly to an expanding mandrel type of holder for supporting hollow bodies of cork, cork composition, cork and rubber compositions, and the like which are radially expansible, during fabrication of such materials into articles of various sorts.

In the manufacture of articles of cork composition and other similar materials which are expansible, it is frequently desirable to grind the outer cylindrical surface to a predetermined diameter to provide also a desired wall thickness. One of the problems involved in such fabrication operations has been the maintenance of a substantially uniform outer diameter and desired wall thickness on the various pieces fabricated in a production run. Conventional expanding mandrels have been found unacceptable because they are ineffective for properly supporting the workpiece without the application of substantial radial forces to the piece, and the application of such forces expands the material. The operator is, therefore, required to attempt to judge the proper positioning of the sleeve on its tapered arbor to obtain a proper gripping action of the expansible workpiece, and at the same time maintain a substantially uniform degree of expansion of the workpiece with respect to other workpieces previously fabricated. This is a task which requires the highest degree of skill; and, even with such skill, it is not possible to obtain the accuracy in dimensions of the finished pieces which is required. If the work-holding sleeve is moved too far along the arbor, the workpiece when it returns to its normal condition subsequent to fabrication will be undersize in both outer diameter and wall thickness. Conversely, if the holding sleeve is not moved far enough along the arbor, the workpiece will be oversize.

It is an object of this invention to provide a work holder which will adequately support the workpiece and which will apply a uniform amount of expansion to each workpiece positioned upon it.

A further object of this invention is to provide a work holder which may be readily actuated to receive a hollow radially expansible workpiece and to apply force to the piece adequate to hold it in proper position for subsequent fabrication, expanding each workpiece to the same extent upon actuation of the work supporting sleeve.

Further objects of the invention will become apparent from a consideration of the following complete description of a preferred embodiment of the invention which has been illustrated in the accompanying drawing and in which:

Figure 1 is a side elevation illustrating a work holder of the present invention with a workpiece disposed thereon and shown in dotted lines;

Figure 2 is an end view of the work holder of Figure 1;

Figure 3 is a side elevation of the arbor of the work holder of Figure 1;

Figure 4 is an end view of the arbor of Figure 3;

Figure 5 is a side elevation of the work supporting sleeve of the work holder of Figure 1;

Figure 6 is a side elevation of the sleeve locking key of the work holder of Figure 1; and Figure 7 is a side elevation partially broken away illustrating a modification of this invention.

Generally, the work holder includes an arbor 2, a work supporting sleeve 3, a sleeve stop 4, a sleeve guard 5, and a work engaging stop 6.

The arbor 2 is provided with a tapered surface 7 and a threaded end 8 provided with a shoulder 9. An opening 10 is provided in the arbor 2 and receives a sleeve locking key 11.

The work supporting sleeve 3 has a substantially cylindrical outer surface 12, and its inner surface is tapered with a taper corresponding to that of the surface 7 of the arbor 2, as indicated by the dotted line I in Figure 1. The work supporting sleeve is provided with a plurality of slots 13 extending axially of the surface 12 to permit radial expansion of the work supporting sleeve as the same is moved along the tapered surface 7 of the arbor. In the embodiment chosen for illustration, there are eight such slots provided. The number of slots will depend upon the size of the sleeve and the degree of expansion required, as well as other variable factors.

The work supporting sleeve is provided with a work engaging stop 14 which is preferably formed integrally with the sleeve as a radial extension thereof.

The sleeve stop 4 is preferably formed as a collar which has a central bore therein, the diameter of which corresponds to the maximum outer diameter of the arbor 2. A set screw 15 or other locking arrangement is provided for securing the sleeve stop 4 in adjusted position on the arbor 2.

The work supporting sleeve 3 is provided with a sleeve stop engaging surface which, in the embodiment illustrated, constitutes the outer surface 16 of the flange 14 which is adapted to engage the sleeve stop 4 and limit the expanding movement of the sleeve and the expansible workpiece which is associated with it for fabrication.

In Figure 1, the expansible workpiece has been shown in dotted lines at 17.

The sleeve guard 5 is provided with a threaded opening 18 which is adapted to receive the threaded projection 8 of the arbor 2. The diameter of the sleeve guard 5 is less than the contracted diameter of the sleeve 3 as shown in Figure 1. This permits ready removal of the workpiece 17 over the sleeve guard 5.

The locking key 11 is provided with a projection 19 which lies above the tapered surface 7 of the arbor 2 as shown in Figure 3 and is adapted to be received in one of the slots 13 when the work supporting sleeve is positioned on the arbor, the projection 19 thus serving to prevent rotation of the sleeve with respect to the arbor.

In the modification of this invention shown in Figure 7, the sleeve guard 5 is omitted, and an actuating collar attached to the tail stock center of a lathe or grinder, for example, is employed for moving the sleeve 3 to proper position in contact with the sleeve stop 4 upon movement of the tail stock into supporting position in engagement with the arbor 2. In Figure 7, the various parts which are the same as those of the other figures have been correspondingly numbered.

In this arrangement, the arbor 2 is provided with a center opening 20 which receives a tail stock center 21. An actuating collar 22 is secured to the tail stock center by a set screw 23. A sleeve engaging surface 24 is provided on the actuating collar 22 and is engageable with a surface 25 of the sleeve 3. The opening 26 in the collar is large enough to freely admit the tapered end of the arbor. The actuating collar is adapted to engage the sleeve 3 and move it to its desired final position simultaneously with the positioning of the tail stock center 21 in the opening 20 of the arbor 2.

In the operation of the device of Figures 1 to 6, the arbor 2 receives the sleeve stop 4, and the sleeve 3 is then placed over the small end of the arbor with the tapered surface 7 of the arbor 2 engaging the correspondingly tapered inner surface of the sleeve 3. The sleeve guard 5 is then threaded into position. The sleeve 3 is then moved to a position where it is in engagement with the sleeve guard 5, and a workpiece 17 is positioned thereover. The sleeve 3 is moved toward the sleeve stop 4, and appropriate measurement is made of the outer diameter of the workpiece 17. Thereupon, the sleeve stop 4 is brought to a position where its stop engaging surface lies in engagement with the corresponding surface 16 on the sleeve 3, and the set screw 15 is drawn into place, locking the stop 4 in adjusted position. Thereafter, in the fabrication of additional pieces, it will be merely necessary to slide the sleeve 3 to a position in engagement with the sleeve guard 5, insert a workpiece over the sleeve 3, moving the same along the sleeve 3 until the workpiece is in engagement with the work engaging stop 14, and thereupon moving the sleeve 3 along the tapered surface 7 until the surface 16 falls in engagement with the stop 4. This operation may be performed by hand or may be performed by suitable mechanical equipment.

The operation of the modified device of Figure 7 will be the same as that of the other views insofar as the adjustment of the sleeve 3 and sleeve stop 4 is concerned. An additional adjustment is made when the sleeve and sleeve stop have been properly positioned with their limiting surfaces in engagement with one another and with the tail stock center 21 in proper position within the center opening 20 of the arbor 2. The actuating collar 22 is then moved to a position where the surfaces 24 and 25 are in engagement and the set screw 23 is drawn down, locking the actuating collar in adjusted position.

With this modification, the tail stock is retracted and a workpiece is inserted over the sleeve and into engagement with the work engaging stop 14. The tail stock is now moved into operating position, such movement automatically sliding the sleeve and the workpiece carried by it along the tapered surface 7 of the arbor 2 and bringing the sleeve into a predetermined position, with the workpiece expanded and ready for fabrication.

From the foregoing, it will be clear that, by the present invention, it is possible to produce a run of articles of hollow radially expansible material with a high degree of uniformity in the finished product.

While there has been illustrated and described a preferred embodiment of the invention, it will be understood that the same is not limited thereto but may be otherwise embodied and practiced within the scope of the following claims.

I claim:

1. In a work holder for hollow radially expansible materials, the combination of a tapered arbor, a sleeve stop, means for securing said sleeve stop in adjusted position on said arbor, a work supporting sleeve having a substantially cylindrical outer surface and a tapered inner surface corresponding substantially with the taper of the arbor, said sleeve being movable on said arbor toward said stop to expanded position and movable away from said stop to contracted position, a work engaging stop on said sleeve for positioning a hollow radially expansible workpiece on said sleeve for expansion therewith, and a sleeve stop engaging surface on said sleeve engageable with said sleeve stop to limit expanding movement of said sleeve and the expansible workpiece associated therewith.

2. In a work holder for hollow radially expansible materials, the combination of a tapered arbor, a sleeve stop adjustable along the axis of said arbor, a work supporting sleeve having a substantially cylindrical outer surface and a tapered inner surface corresponding substantially with the taper of the arbor, said sleeve being movable on said arbor toward said stop to expanded position and away from said stop to contracted position, a work engaging stop on said sleeve for positioning a hollow radially expansible workpiece on said sleeve for expansion therewith, and means for holding said sleeve stop in adjusted position with respect to the arbor to predetermine the expanding movement of said sleeve and the expansible workpiece associated therewith.

3. In a work holder for hollow radially expansible materials, the combination of a tapered arbor, a sleeve stop secured to said arbor, a sleeve guard also secured to the arbor in spaced relationship to said sleeve stop, a work supporting sleeve having a substantially cylindrical outer surface and a tapered inner surface corresponding substantially with the taper of the arbor, said sleeve being movable on said arbor between said sleeve stop and said sleeve guard toward said sleeve stop to a limited expanded position and toward said sleeve guard to a contracted position, a work engaging stop on said sleeve for positioning a hollow radially expansible workpiece on said sleeve for expansion therewith, means for securing said sleeve stop in adjusted position on said arbor, and a sleeve stop engaging surface on said sleeve engageable with said sleeve stop to limit expanding movement of said sleeve and the expansible workpiece associated therewith.

4. In a work holder for hollow radially expansible materials, the combination of a tapered arbor, a sleeve stop carried by said arbor and adjustable along the axis thereof, a work supporting sleeve having a substantially cylindrical outer surface for the reception of a hollow radially expansible workpiece and a tapered inner surface corresponding substantially with the taper of the arbor, said sleeve being movable on said arbor toward said stop to expanded position and away from said stop to contracted position, and means for holding said sleeve stop in adjusted position with respect to the arbor to predetermine the expanding movement of said sleeve in the expansible workpiece associated therewith.

5. In a work holder for hollow radially expansible materials, the combination of a tapered arbor, a sleeve stop adjustable along the axis of said arbor, a work supporting sleeve having a substantially cylindrical outer surface for positioning a hollow radially expansible workpiece and a tapered inner surface corresponding substantially with the taper of the arbor, said sleeve being provided with slots extending reversely from opposite ends thereof, a locking key affixed to said arbor and having a portion thereof projecting radially above the tapered surface of the arbor to lie within one of said slots in said sleeve, said sleeve being movable on said arbor toward said stop to expanded position and away from said stop to contracted position with said key lying within said slot during such movement, and means for holding said sleeve stop in adjusted position with respect to the arbor to predetermine the expanding movement of said sleeve and the expansible workpiece associated with it.

6. In a work holder for hollow radially expansible materials such as cork composition and the like, the combination of a tapered arbor, a sleeve stop comprising a collar having a bore therein permitting said stop to be moved axially along the length of said arbor, locking means passing through said collar and engageable with said arbor to secure said stop in adjusted position on said arbor, a work supporting sleeve having a substantially cylindrical outer surface for positioning a hollow radially expansible workpiece and a tapered inner surface corresponding substantially with the taper of the arbor, said sleeve having a plurality of axially extending slots in the surface thereof extending alternately from one end to a point adjacent the opposite end of the sleeve, said sleeve being movable on said arbor toward said stop to expanded position and movable away from said stop to contracted position, a flange formed on said sleeve and projecting radially from the cylindrical surface and adapted to engage a hollow radially expansible workpiece on said sleeve for expansion therewith, a locking key passing into said arbor and having a portion projecting above the tapered surface thereof and lying within one of the grooves of said sleeve, a sleeve stop engaging surface on said flange engageable with said sleeve stop to limit expanding movement of said sleeve and the expansible workpiece associated therewith, a sleeve guard attached to a terminal end of said tapered arbor, said guard projecting radially above the tapered surface of said arbor an amount less than the diameter of the cylindrical surface of said sleeve when the same is in contracted position on said arbor to permit insertion of a workpiece over said guard and onto said work supporting cylindrical surface of said sleeve, said locking key permitting axial movement of said sleeve on said arbor and limiting rotary motion of said sleeve with respect to said arbor.

7. In a work holder for radially expansible materials, the combination of a tapered arbor, a work supporting sleeve having a substantially cylindrical outer surface for positioning a hollow radially expansible workpiece and a tapered inner surface corresponding substantially with the taper of the arbor, said sleeve being movable on said arbor to an expanded position, means movable from a position remote from the arbor to a position engageable with one end of the arbor for supporting the same for rotation, and sleeve actuating means carried by said arbor support and engageable with said sleeve to move the same along said arbor to a predetermined expanded position when the arbor support is moved from remote position to supporting position.

RICHARD F. LESCALLETTE.

REFERENCES CITED

The following references are of record in the file of this patent:

UNITED STATES PATENTS

| Number | Name | Date |
|---|---|---|
| 138,947 | Smith | May 13, 1873 |
| 1,930,669 | Varcoe et al. | Oct. 17, 1933 |
| 2,360,968 | Murdy | Oct. 24, 1944 |

FOREIGN PATENTS

| Number | Country | Date |
|---|---|---|
| 225,409 | Switzerland | Jan. 31, 1943 |